United States Patent
Mayer

(10) Patent No.: US 7,323,844 B2
(45) Date of Patent: Jan. 29, 2008

(54) CIRCUIT AND METHOD FOR CONTROL OF A STEPPER MOTOR

(75) Inventor: Walter Mayer, Bruehl (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 257 days.

(21) Appl. No.: 11/173,604

(22) Filed: Jul. 1, 2005

(65) Prior Publication Data

US 2006/0176008 A1    Aug. 10, 2006

(30) Foreign Application Priority Data

Jul. 2, 2004    (DE) .................. 10 2004 033 399

(51) Int. Cl.
*H02P 8/00* (2006.01)

(52) U.S. Cl. .................. 318/696; 318/34; 318/49; 318/50; 318/685; 310/181; 310/184

(58) Field of Classification Search .............. 318/696, 318/685, 34, 49, 50; 310/181, 184
See application file for complete search history.

(56) References Cited

U.S. PATENT DOCUMENTS

| | | | |
|---|---|---|---|
| 4,081,736 A | * | 3/1978 | Leenhouts et al. .......... 318/696 |
| 4,513,904 A | * | 4/1985 | Woodard et al. ............. 228/116 |
| 4,558,268 A | | 12/1985 | Besson et al. ............... 318/696 |
| 4,717,866 A | * | 1/1988 | Gray ........................... 318/696 |
| 5,270,597 A | * | 12/1993 | Yubazaki et al. .......... 310/49 R |
| 6,246,205 B1 | | 6/2001 | Kujira et al. ................ 318/685 |
| 6,586,898 B2 | * | 7/2003 | King et al. .................. 318/254 |

FOREIGN PATENT DOCUMENTS

| | | |
|---|---|---|
| DE | 199 25 451 A1 | 1/2000 |
| DE | 102 37 434 A1 | 2/2004 |
| EP | 0 657 990 A1 | 6/1995 |
| WO | WO 01/31773 A1 * | 3/2001 |
| WO | WO 01/31773 A1 | 5/2001 |

* cited by examiner

*Primary Examiner*—Rita Leykin
(74) *Attorney, Agent, or Firm*—Brinks Hofer Gilson & Lione

(57) ABSTRACT

A circuit for the control of a stepper motor having a rotor configured as a permanent magnet and a stator configured of at least first and second energized excitation coils enclosing the rotor. Each end terminal of the first excitation coil is connected to the positive pole of the supply voltage over a switching element and each end terminal of a second excitation coil is connected to the negative pole of the supply voltage over a switching element. The central contacts of both excitation coils are connected to each other.

6 Claims, 8 Drawing Sheets

FIG. 1 - State-of-the-art

FIG. 2 - State-of-the-art

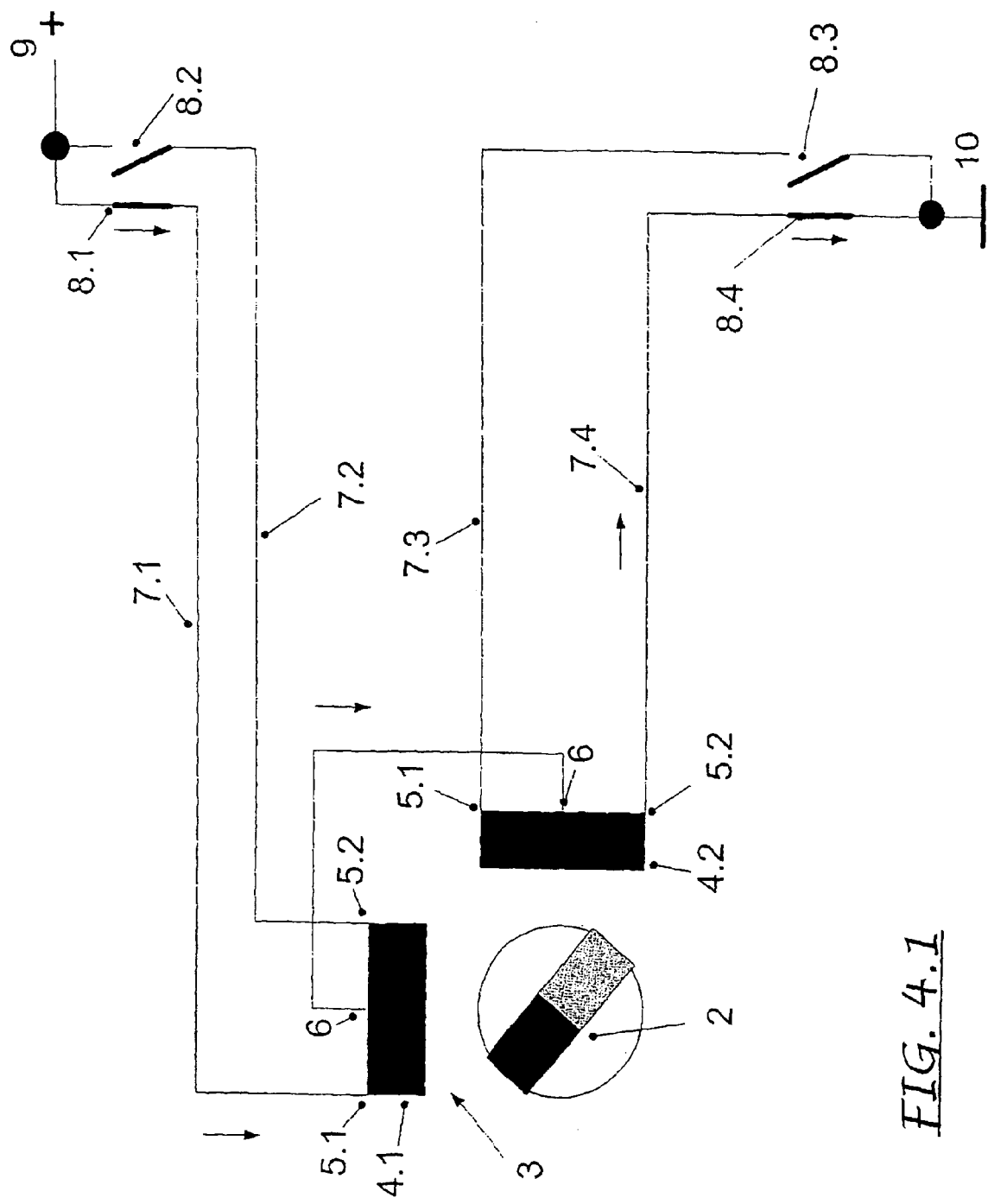
FIG. 4.1

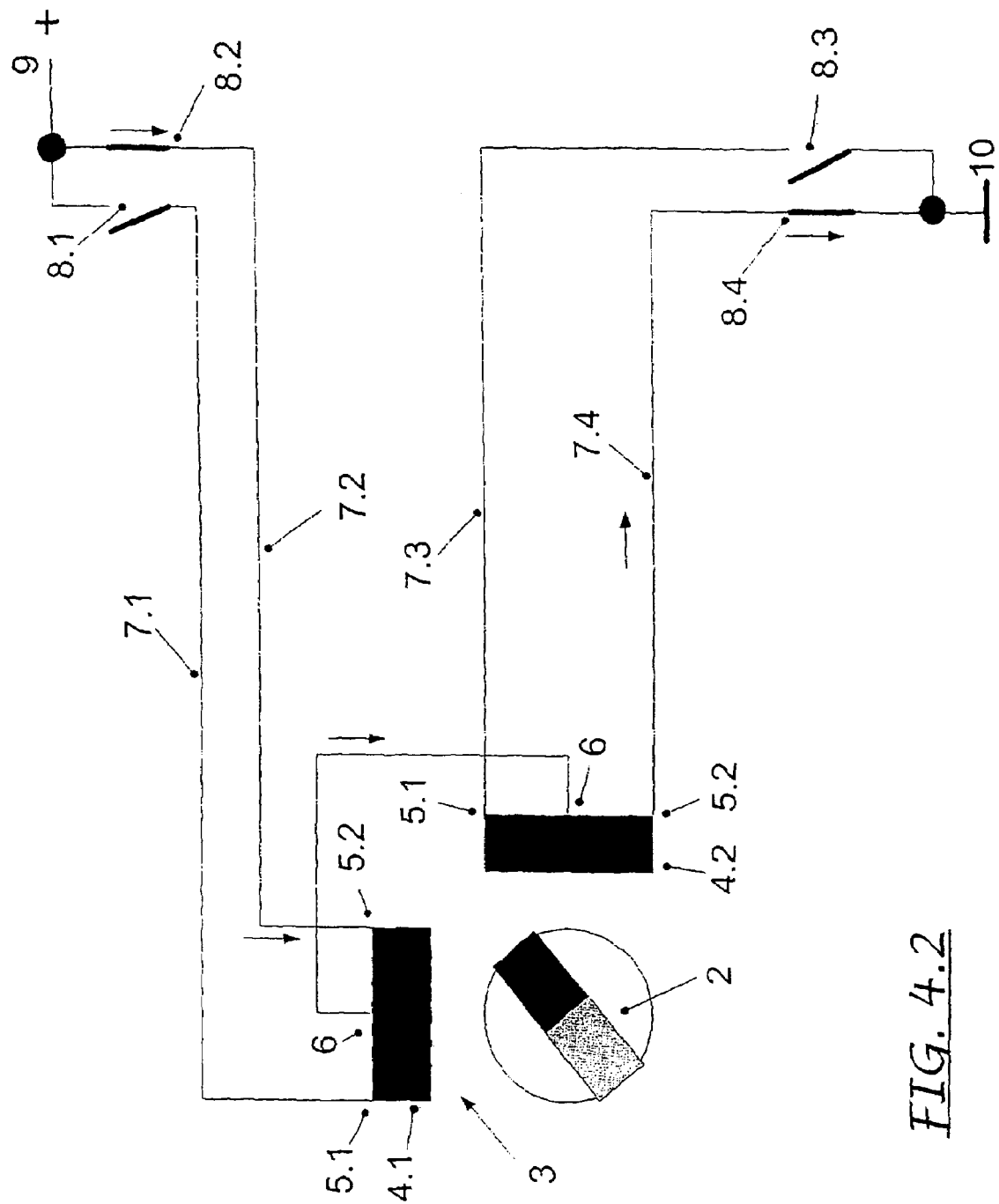
FIG. 4.2

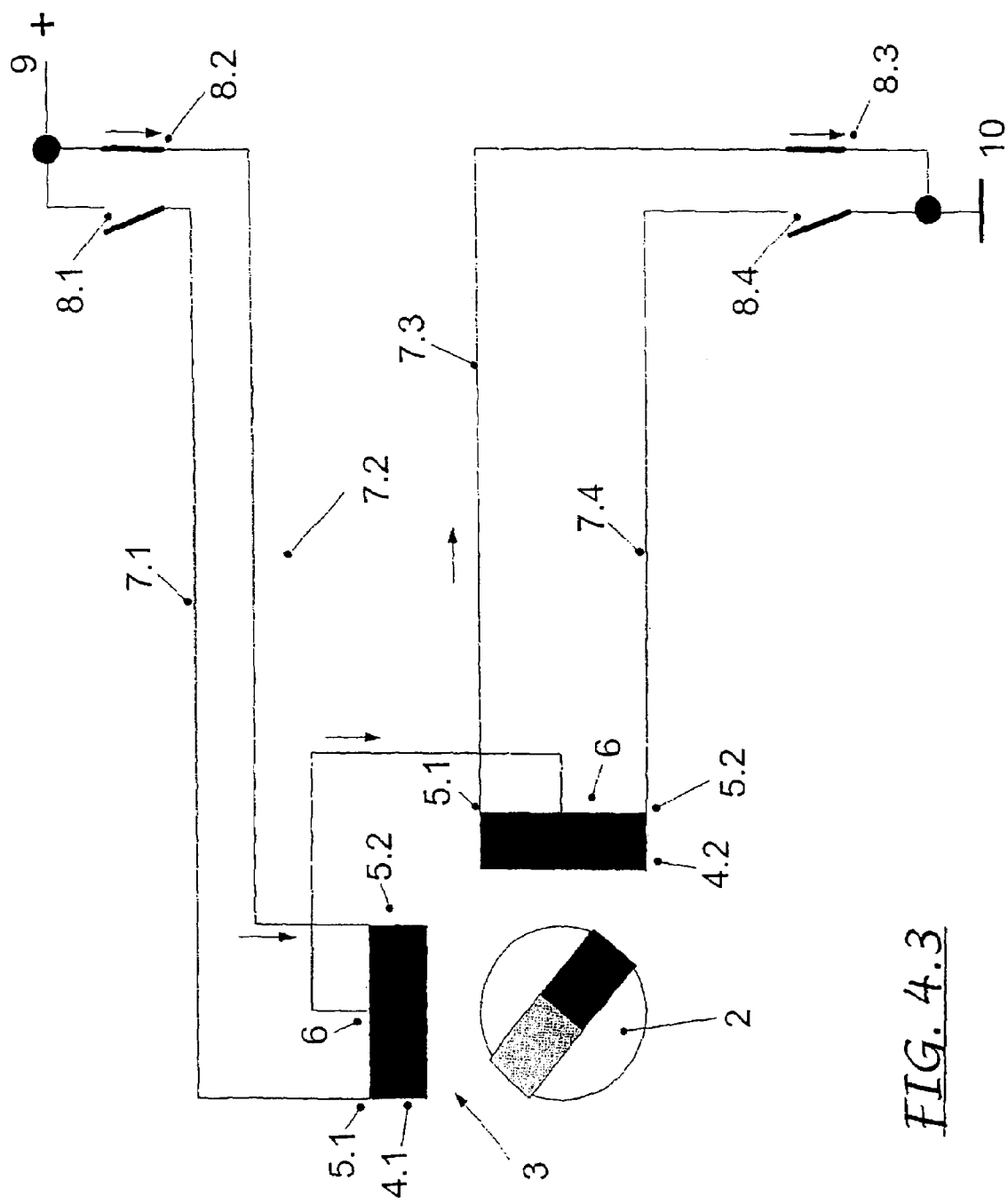
FIG. 4.3

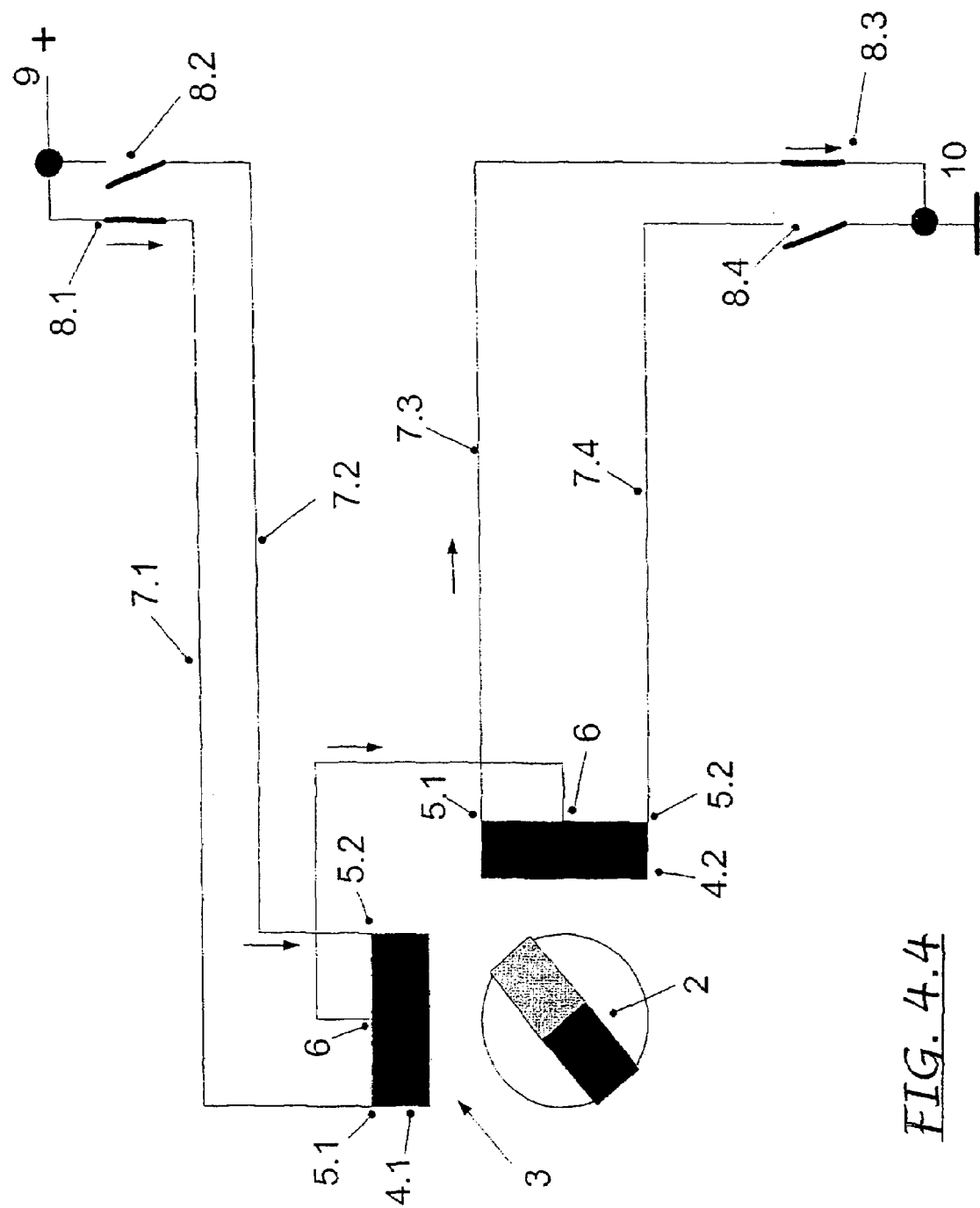
FIG. 4.4

CIRCUIT AND METHOD FOR CONTROL OF A STEPPER MOTOR

BACKGROUND

1. Field of the Invention

The invention relates to a circuit and a method for the control of a stepper motor.

2. Related Technology

Stepper motors are used in units and modules in the fields of automotive or office communication, medical engineering, toolmaking, consumer electronics, building services or measurement technology. They are suitable drives for the transformation of digital information to mechanical movement.

Due to the fast development of the semiconductor industry, particularly because of the greater variety of the transistors, diodes and integrated circuits, stepper motors are used not only in price-sensitive applications, but also where the mechanical commutation system of the dc motors limits the reliability or life of a drive. Stepper motors are more and more used also as controlled auxiliary drives.

Stepper motors have usually a stator winding with several separately switchable stator coils the number of which corresponds to the step angle of the stepper motor. Speed and position of the rotor are controlled by an open control chain. Bipolar driver ICs as well as discrete unipolar transistors are used for the control. Therefore the control unit can always determine the current position of the rotor and, dependent on the result of the determination, move to a new position.

Different operational conditions can be realized dependent on the wiring and control of the coils. On principle, stepper motors may be classified as unipolar and bipolar stepper motors.

In unipolar stepper motors only one coil half of the stator coils is energized. While the central taps of the coils are connected to the supply voltage, the end terminals of the coils each are grounded over an associated switch so that for the unipolar operational mode with two coils, five connection lines to the motor and four switches for control are necessary.

In bipolar stepper motors the coils are energized over their total length. In this case the coils of the stepper motor are operated in an H-bridge circuit each so that the current direction in the magnets can be changed for polarity reversal of the magnetic fields. When two coils are used, four supply lines to the motor and eight switches are necessary.

A plurality of circuit configurations are known in the state-of-the-art.

DE 102 374 34 A1, e.g., discloses a voltage supply for electromotors whereby the output voltage of a dc voltage source with a positive terminal and a negative terminal is halved by means of a voltage phase-balance circuit which in addition to the positive terminal and the negative terminal has a zero potential output that is connected to a terminal of each connected electromotor. At least one further terminal of each connected electromotor is connected to two driver transistors of a half-bridge in each case, which is connected, on the one hand, to the positive terminal and, on the other hand, to the negative terminal.

In DE 199 25 451 A1, an apparatus for driving a stepper motor using a simplified circuit structure and a bipolar driver system is described. It is characteristic of this invention that the stepper motor has two excitation coils driven by the respective bridge circuits. The transistors provided on two sides of a bridge circuit are used by both bridge circuits in common. Therefore the driver circuit can be designed having a reduced number of transistors.

Another driver circuit for a stepper motor is disclosed in WO 01/31773. The driver circuit consists of one or several pairs of excitation coils, whereby each excitation coil has two end contacts and a central tap with the central taps of the excitation coils connected to each other. Moreover, switching elements are provided that are designed such that the positive terminal of the supply voltage is energized over an end contact of a first excitation coil and the negative terminal of the supply voltage is energized over a second excitation coil.

In U.S. Pat. No. 4,558,268 a circuit for the control of stepper motors is described that is provided with several half-bridges for two stepper motors. In this way the number of the needed switching elements can be reduced, but the stepper motors, however, cannot be operated independently of each other.

In EP 0 657 990 A1, however, a method for the simultaneous control of several stepper motors is disclosed that uses a diode multiplex. Also, here switching elements can be saved, but additional diodes are required at the stepper motors. Moreover, also this method does not allow to operate the stepper motors independently of each other.

It is the object of the invention to propose a circuit and a method for the control of a stepper motor that require only a small number of switching elements and connection lines and, in addition, ensure to operate serially connected stepper motors independently of each other.

SUMMARY

It is provided according to the invention that the circuit for the control of a stepper motor includes a rotor configured as a permanent magnet and a stator configured of at least two energized excitation coils enclosing the rotor. Each end terminal of a first excitation coil is connected to the positive pole of the supply voltage over a switching element and each end terminal of a second excitation coil is connected to the negative pole of the supply voltage over a switching element. The central contacts of both excitation coils are connected to each other.

The advantage of this circuit arrangement consists in that only four switching elements and four connection lines are needed for the control of the stepper motor. The advantages of the bipolar stepper motor, which needs only four connection lines, and of the unipolar stepper motor, which needs only four switching elements, are combined in the circuit arrangement of the invention.

Both end terminals of a first coil are connected to the positive terminal of the supply voltage by means of a supply line and using one switching element in each case. Both end terminals of a second coil, however, are connected to the negative terminal of the supply voltage by means of a supply line and using one switching element in each case. As it will be described further down, four different magnetic states can be generated in the stepper motor by means of a defined switching sequence of the four switching elements used.

Preferably field effect transistors, bipolar transistors, an integrated circuit (IC) or a relay are used as switching elements.

Another substantial advantage of this invention is that when there are several serially connected stepper motors operation of each individual stepper motor independent of the others can be ensured without multiplex operation.

In serial connection of stepper motors, the excitation coils of the stepper motors connected to the positive pole of the supply voltage are connected to each other forming a connection node. In addition, the connection nodes between neighboring coils and the free end terminals of the outer excitation coils are led to the positive pole of the supply voltage over switching elements. The excitation coils led to the negative pole of the supply voltage are also connected to each other forming a connection node. In addition, the connection nodes between neighboring excitation coils and the free end terminals of the outer excitation coils are led to the negative pole of the supply voltage.

In the serial circuit according to the invention, the number $A_S$ of the switching elements required is reduced to the equation $A_S=2*(n+2)$, wherein n is the number of the stepper motors. For 5 serially connected stepper motors, e.g., only 14 switching elements are needed.

The method for the control of a stepper motor includes using a rotor configured as a permanent magnet and a stator configured of at least two energized excitation coils completely enclosing the rotor. A first end terminal of a first excitation coil is connected over a first switching element and a second end terminal of the first excitation coil is connected over a second switching element to the positive pole of the supply voltage. A first end terminal of a second excitation coil is connected over a third switching element and the second end terminal of a second excitation coil is connected over a fourth switching element to the negative pole of the supply voltage. The central contacts of both excitation coils are connected to each other, whereby for the control of the stepper motor to rotate in clockwise direction, the following process steps repeating themselves are provided:

a) closing of the first and the fourth switching element and opening of the second and the third switching element;

b) closing of the second and the fourth switching element and opening of the first and the third switching element;

c) closing of the second and the third switching element and opening of the first and the fourth switching element; and d) closing of the first and the third switching element and opening of the second and the fourth switching element.

For persons skilled in the art it is evident that the enumerated process steps only relate to a single 360°-rotation of the rotor and that the process steps a) to d) continuously repeat themselves to ensure continuous operation of the stepper motor.

Rotation of the rotor configured as a permanent magnet in anticlockwise direction is realized in an especially simple manner by that the process steps a) to d) are executed in reverse order.

The significant advantages and features of the invention over the state-of-the-art include the combination of a bipolar and a unipolar operated stepper motor by that only one supply line and one switching element are assigned to each end terminal of both coils, whereby the end terminals of a first coil are led to the positive pole and the end terminals of a second coil are led to the negative pole of the supply voltage and the central contacts of both coils connected to each other, and totally independent operation of several serially connected stepper motor without multiplexing.

BRIEF DESCRIPTION OF THE DRAWINGS

Further features and advantages of the invention will become readily apparent to persons skilled in the art after a review of the following detailed description of a preferred embodiment, with reference to the appended drawings, which shows:

FIGS. 4.1-4.4 illustrate the four magnetic states or phases, respectively, of the rotor in the circuit of FIG. 3.

DETAILED DESCRIPTION

Figure 1:
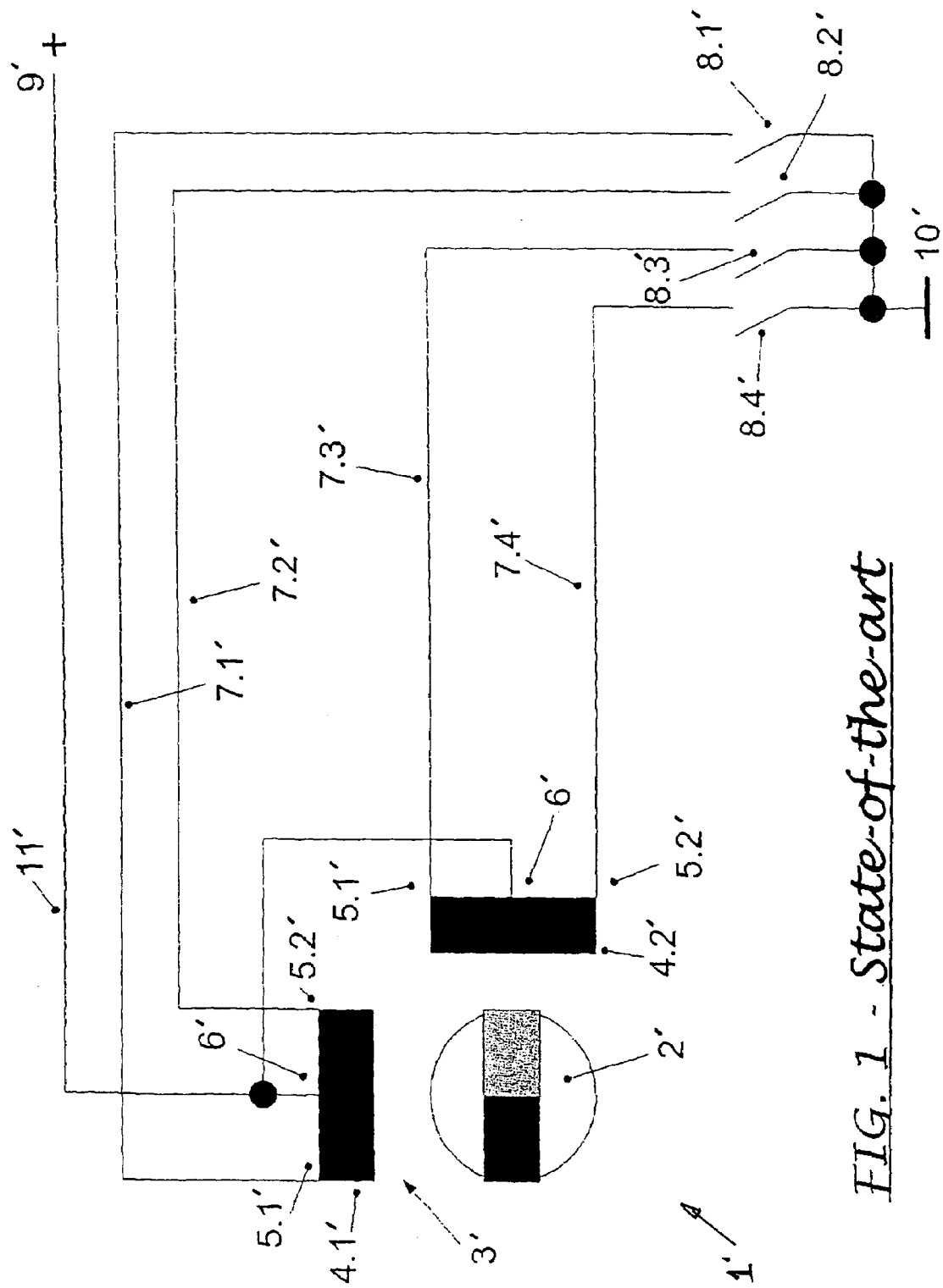
FIG. 1 is a typical unipolar operated stepper motor of the prior art.

FIG. 1 illustrates a typical unipolar operated stepper motor 1' of the state-of-the-art. It is seen that the stepper motor 1' has a rotor 2' structured as a permanent magnet and two excitation coils 4.1, 4.2 structured as stator 3. Each excitation coil 4.1', 4.2' includes two end terminals 5.1', 5.2' and a central contact 6'. All end terminals 5.1', 5.2' of both excitation coils 4.1', 4.2' are led to the negative pole 10', or ground, of the supply voltage over connection lines 7.1' to 7.4' using a switching element 8.1' to 8.4' in each case. The central contacts 6' of both excitation coils 4.1', 4.2' are connected to each other and connected to the positive pole 9' of the supply voltage by a common switching line 11'. For this circuit arrangement, therefore, four switching elements 8.1' to 8.4', four connection lines 7.1' to 7.4' and one switching line 11 are required.

Figure 2:
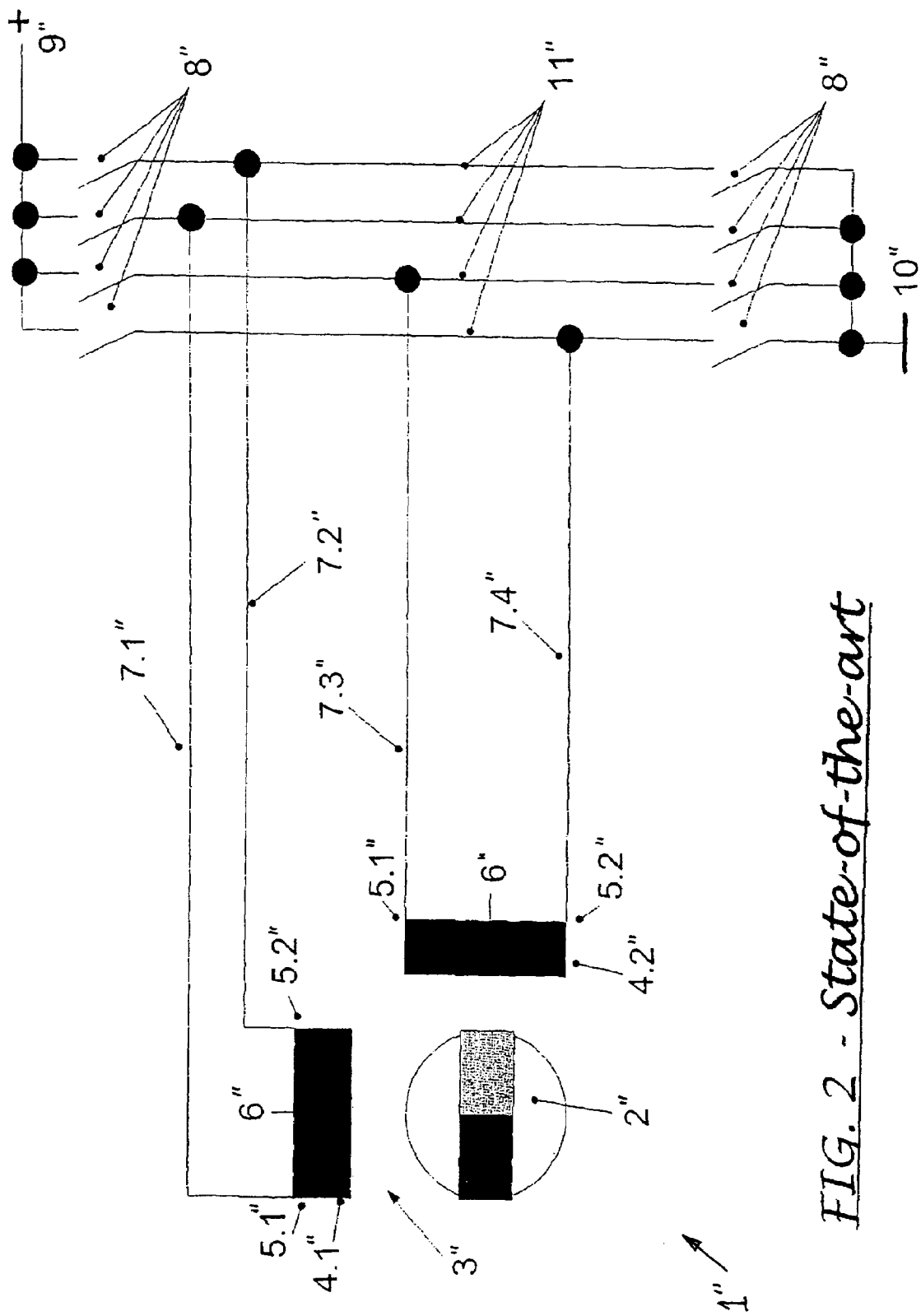
FIG. 2 is a typical bipolar operated stepper motor of the prior art.

In FIG. 2 a typical circuit arrangement of a bipolar operated stepper motor of the state-of-the-art is shown. As opposed to the circuit arrangement illustrated in FIG. 1, first, the central contacts 6" of both excitation coils 4.1", 4.2" are not connected to each other. Second, the end terminals 5.1", 5.2" of both excitation coils 4.1", 4.2" are connected over connection lines 7.1" to 7.4" to a switching line 11", each switching line 11" extending between the positive pole 9" and the negative pole 10" of the supply voltage. Each switching line 11" is provided with two switching elements 8", whereby a first one of these two switching elements 8" is placed at the positive pole 9" and a second one of these two switching elements 8" is placed at the negative pole 10" of the supply voltage. Thus, for this circuit arrangement four connection lines 7.1" to 7.4" to the stepper motor 1" and eight switching elements 8" are required.

Figure 3:
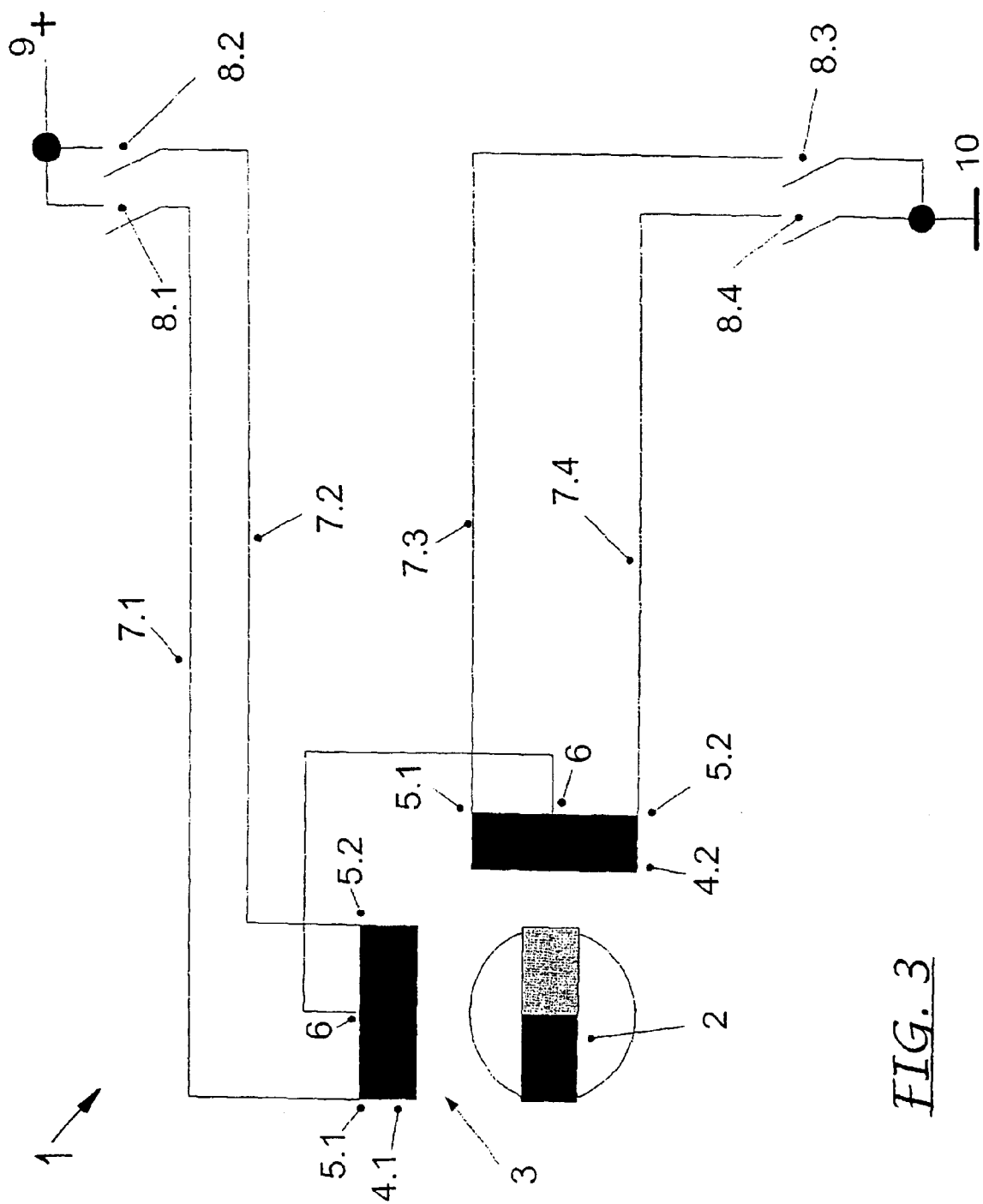
FIG. 3 is a circuit arrangement according to the invention for the operation of a stepper motor.

The circuit arrangement according to the invention for the control of a stepper motor 1 is shown in FIG. 3. Both end terminals 5.1, 5.2 of a first excitation coil 4.1 are led to the positive pole 9 of the supply voltage, each by one connection line 7.1 to 7.4 and each by use of one switching element 8.1, 8.2. Both end terminals 5.1, 5.2 of a second excitation coil 4.2, on the other hand, are led to the negative pole 10 of the supply voltage each by one connection line 7.1 to 7.4 and each by use of one switching element 8.1, 8.2. The central contacts 6 of both excitation coils 4.1, 4.2 are connected to each other. Four different magnetic states can be generated in the stepper motor 1 by means of a defined switching sequence for the control of the four switching elements 8.1 to 8.4 used, as described in the FIGS. 4.1-4.4. The number of the required switching elements 8 and the number of the required connection lines 7 are reduced to four.

The FIGS. 4.1-4.4 show the four magnetic states or phases of the rotor 2 according to the method of circuit arrangement of the invention. The circuit arrangement in this case corresponds to FIG. 3. For the control of the stepper motor 1 to rotate in clockwise direction the process steps described in the FIGS. 4.1-4.4 are continuously repeated.

In FIG. 4.1 the first and the fourth switching element 8.1, 8.4 are closed and the second and the third switching element 8.2, 8.3 are opened. As indicated by the arrows the current flows starting from the positive pole 9 of the supply voltage over the closed first switching element 8.1 to a first end contact 5.1 of the first excitation coil 4.1. After having passed the first excitation coil 4.1 the current is led over the central contact 6 of the first excitation coil 4.1 to the central contact 6 of the second excitation coil 4.2. After having passed the second excitation coil 4.2 the current is led over a second end contact 5.2 of the second excitation coil 4.2 over the closed fourth switching element 8.4 to the negative pole 10 of the supply voltage.

In FIG. 4.2 the second and the fourth switching element 8.2, 8.4 are closed and the first and the third switching element 8.1, 8.3 are opened. As indicated by the arrows the current flows starting from the positive pole 9 of the supply voltage over the dosed second switching element 8.2 to a second end contact 5.2 of the first excitation coil 4.1. After having passed the first excitation coil 4.1 the current is led over the central contact 6 of the first excitation coil 4.1 to the central contact 6 of the second excitation coil 4.2. After having passed the second excitation coil 4.2 the current is led over a second end contact 5.2 of the second excitation coil 4.2 over the closed fourth switching element 8.4 to the negative pole 10 of the supply voltage.

In FIG. 4.3 the second and the third switching element 8.2, 8.3 are closed and the first and the fourth switching element 8.1, 8.4 are opened. As indicated by the arrows the current flows starting from the positive pole 9 of the supply voltage over the closed second switching element 8.2 to a second end contact 5.2 of the first excitation coil 4.1. After having passed the first excitation coil 4.1 the current is led over the central contact 6 of the first excitation coil 4.1 to the central contact 6 of the second excitation coil 4.2. After having passed the second excitation coil 4.2 the current is led over a first end contact 5.1 of the second excitation coil 4.2 over the closed third switching element 8.3 to the negative pole 10 of the supply voltage.

In FIG. 4.4 the first and the third switching element 8.1, 8.3 are closed and the second and the fourth switching element 8.1, 8.4 are opened. As indicated by the arrows the current flows starting from the positive pole 9 of the supply voltage over the closed first switching element 8.1 to a second end contact 5.2 of the first excitation coil 4.1. After having passed the first excitation coil 4.1 the current is led over the central contact 6 of the first excitation coil 4.1 to the central contact 6 of the second excitation coil 4.2. After having passed the second excitation coil 4.2 the current is led over a second end contact 5.2 of the second excitation coil 4.2 over the closed third switching element 8.3 to the negative pole 10 of the supply voltage.

Dependent on the dosing position of the four switching elements 8.1 to 8.4 the permanent magnet configured as rotor 2 rotates by 90° after each switching.

A rotation of the rotor 2 in anticlockwise direction is made possible by that the process steps of the FIGS. 4.1 to 4.4 are executed in reverse order.

Figure 5:
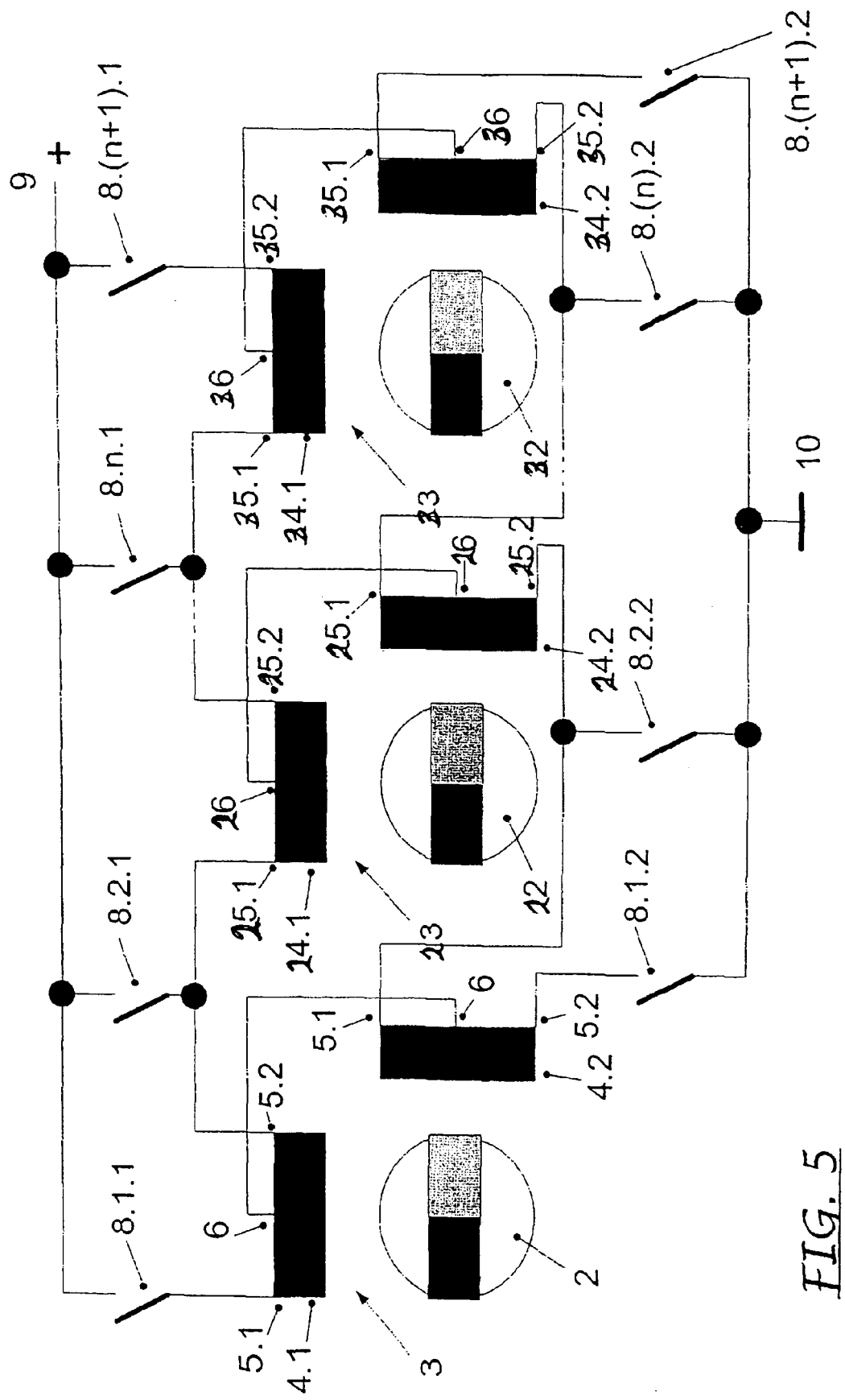
FIG. 5 is a circuit arrangement, according to the invention, of three serially connected stepper motors.

If several stepper motors 1 are to be serially coupled to each other, they are switched according to FIG. 5. In this figure, three stepper motors 1 are connected to each other such that they can also be operated independently of each other despite of the use of the same switching elements.

In serial connection of stepper motors 1 the excitation coils 4.1, 24.1, 34.1 each connected to the positive pole 9 of the supply voltage, of the stepper motors are connected to each other forming a connection node. For that, the second end contact 5.2 of the first excitation coil 4.1 of the first stepper motor is connected to the first end contact 25.1 of the first excitation coil 24.1 of the second stepper motor and the second end contact 25.2 of the first excitation coil 24.1 of the second stepper motor is connected to the first end contact 35.1 of the first excitation coil 34.1 of the third stepper motor forming nodes. Between these nodes and the positive pole 9 of the supply voltage the switching elements 8.2.1, 8.3.1 are placed. Further, the first end contact 5.1 of the first excitation coil 4.1 of the first stepper motor 1 and the second end contact 35.2 of the first excitation coil 34.1 of the third stepper motor are connected over the switching elements 8.1.1, 8.4.1 to the positive pole 9 of the supply voltage. The central contacts 6, 26, 36 of the excitation coils 4.1, 4.2; 24.1, 24.2; 34.1, 34.2 are connected to each other as in single operational mode of a single stepper motor 1.

In addition, the first end contact 5.1 of the second excitation coil 4.2 of the first stepper motor is connected to the second end contact 25.2 of the second excitation coil 24.2 of the second stepper motor and the first end contact 25.1 of the second excitation coil 24.2 of the second stepper motor is connected to the second end contact 35.2 of the second excitation coil 34.2 of the third stepper motor forming nodes. Between these nodes and the negative pole 10 of the supply voltage the switching elements 8.2.2 and 8.3.2 are placed. Further, the second end contact 5.2 of the second excitation coil 4.2 of the first stepper motor 1 and the first end contact 35.1 of the second excitation coil 34.2 of the third stepper motor 1 are connected to the negative pole 10 of the supply voltage over the switching elements 8.1.2, 8.4.2.

In the example shown, the first stepper motor is controlled over the switching elements 8.1.1, 8.2.1, 8.1.2 and 8.2.2 and each n-th stepper motor is controlled over the switching elements 8.n.1, 8.(n+1).1, 8.n.2 and 8.(n+1).2.

The invention claimed is:

1. A circuit for the control of a stepper motor, the circuit comprising:
   a plurality of stepper motors connected to each other, each stepper motor having a rotor including a permanent magnet, a stator including at least a first and a second excitation coil generally enclosing the rotor;
   the first excitation coils of each stepper motor being connected to the positive pole of the supply voltage and being serially connected to each other, a connection node defined between neighboring first excitation coils and each free end terminal of an outer one of the first excitation coils being connected to the positive pole of the supply voltage over one switching element;
   the second excitation coils of each stepper motor being connected to the negative pole of the supply voltage and being serially connected to each other, a connection node defined between neighboring second excitation coils and being connected over one switching element to a negative pole of the supply voltage, each free end terminal of an outer one of the second excitation coils being connected to the negative pole of the supply voltage over one switching element; and
   a central contact of each of the first and second excitation coils being connected to each other.

2. The circuit according to claim 1 wherein the switching elements are configured as one selected from the group of field effect transistors, bipolar transistors, integrated circuit or relay.

3. A method for the control of a stepper motor having a rotor configured as a permanent magnet, a stator configured of at least two energized excitation coils generally enclosing the rotor, whereby a first end terminal of a first excitation coil over a first switching element and a second end terminal of a first excitation coil over a second switching element are connected to a positive pole of a supply voltage, and first end terminal of a second excitation coil over a third switching element and a second end terminal of a second excitation coil over a fourth switching element are connected to a negative pole of the supply voltage and the central contacts of both the first and second excitation coils are connected to each other, whereby for the control of the stepper motor to rotate in clockwise direction the method comprises the following steps:

a) closing of the first and the fourth switching element and opening of the second and the third switching element;

b) closing of the second and the fourth switching element and opening of the first and the third switching element;

c) closing of the second and the third switching element and opening of the first and the fourth switching element; and d) closing of the first and the third switching element and opening of the second and the fourth switching element.

4. The method for the control of a stepper motor as set forth in claim 3 wherein the stepper motor is caused to rotate in anticlockwise direction by the process steps being consecutively executed one after the other in a reverse order of (d), (c), (b), (a).

5. A circuit for the control of a plurality of stepper motors, the circuit comprising:

a plurality of stepper motors including a rotor having a permanent magnet and a stator having first and second excitation coils generally enclosing the rotor;

the first excitation coils having end terminals and being serially connected together to a positive pole of a voltage source, a connection node defined between adjacent ones of the serially connected end terminals of the first excitation coils, two non-adjacent ones of said end terminals each being connected to the positive pole by a switching element, the connection node being connected to the positive pole by a switching element;

the second excitation coils having end terminals and being serially connected together to a negative pole of the voltage source, a connection node defined between adjacent ones of the serially connected end terminals of the second excitation coils, two non-adjacent ones of said end terminals each being connected to the negative pole by a switching element, the connection node being connected to the negative pole by a switching element; and the first excitation coil of each of the stepper motors being connected to the second excitation coil of that one of the stepper motors at a central contact.

6. The circuit according to claim 5 wherein the switching elements are configured as one selected from the group of field effect transistors, bipolar transistors, integrated circuit or relay.

* * * * *

UNITED STATES PATENT AND TRADEMARK OFFICE
CERTIFICATE OF CORRECTION

PATENT NO. : 7,323,844 B2  Page 1 of 1
APPLICATION NO. : 11/173604
DATED : January 29, 2008
INVENTOR(S) : Walter Mayer It is certified that error appears in the above-identified patent and that said Letters Patent is hereby corrected as shown below:

On the Title Page

Item 30 Column 1, line 1, under "Foreign Application Priority Data", delete "10 2004 033 399" and substitute --10 2004 033 399.8-- in its place.

Signed and Sealed this

Third Day of June, 2008

JON W. DUDAS
*Director of the United States Patent and Trademark Office*